UNITED STATES PATENT OFFICE.

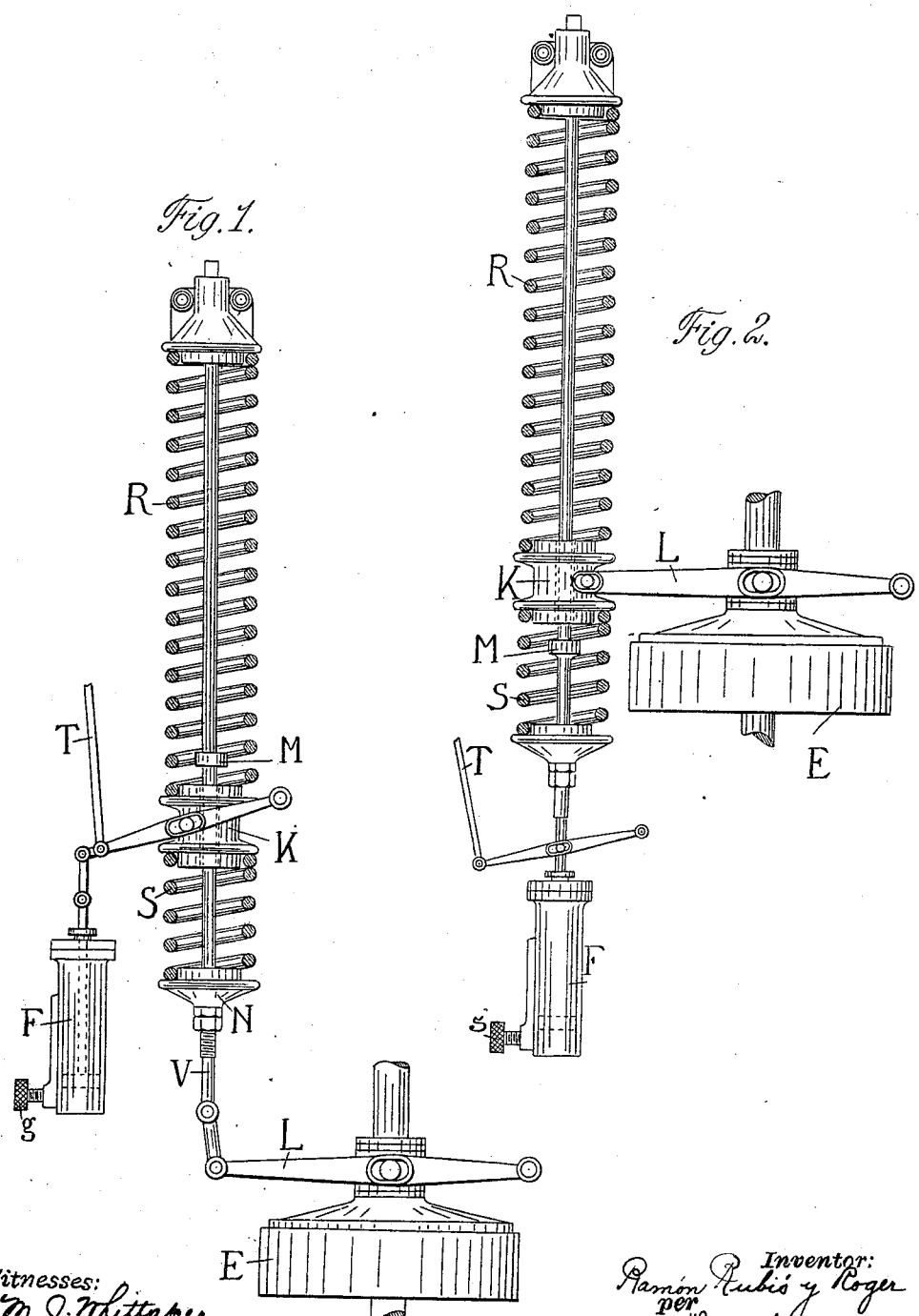

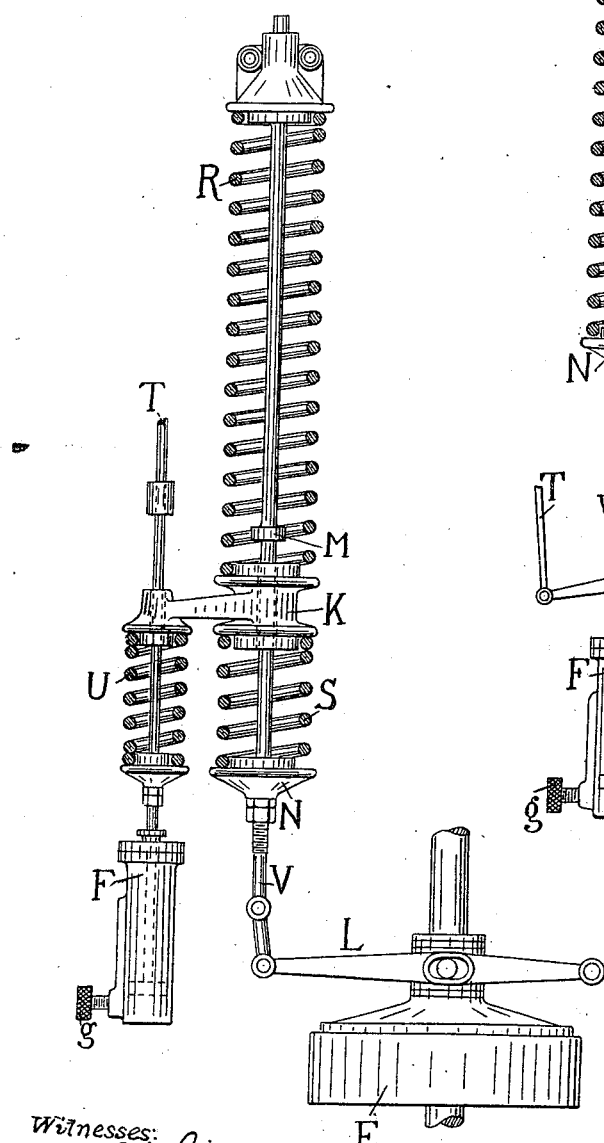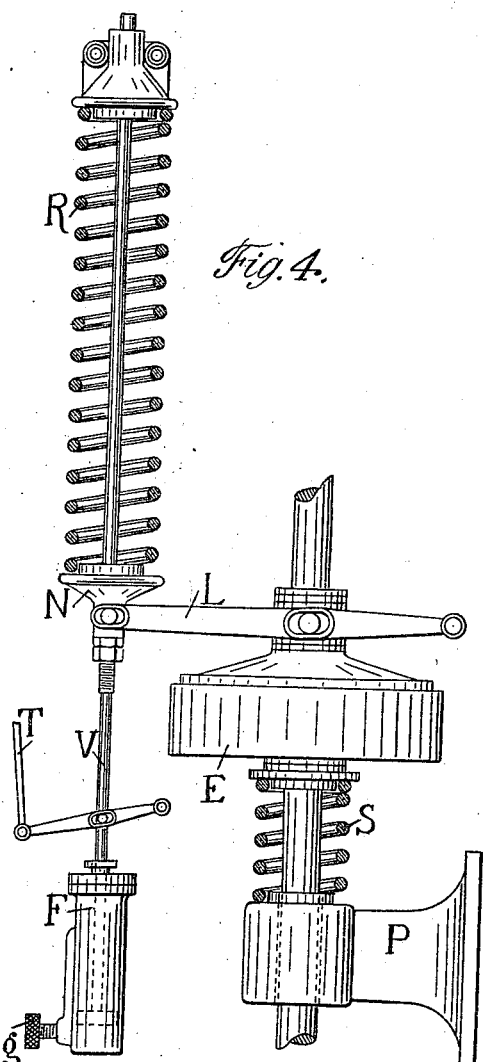

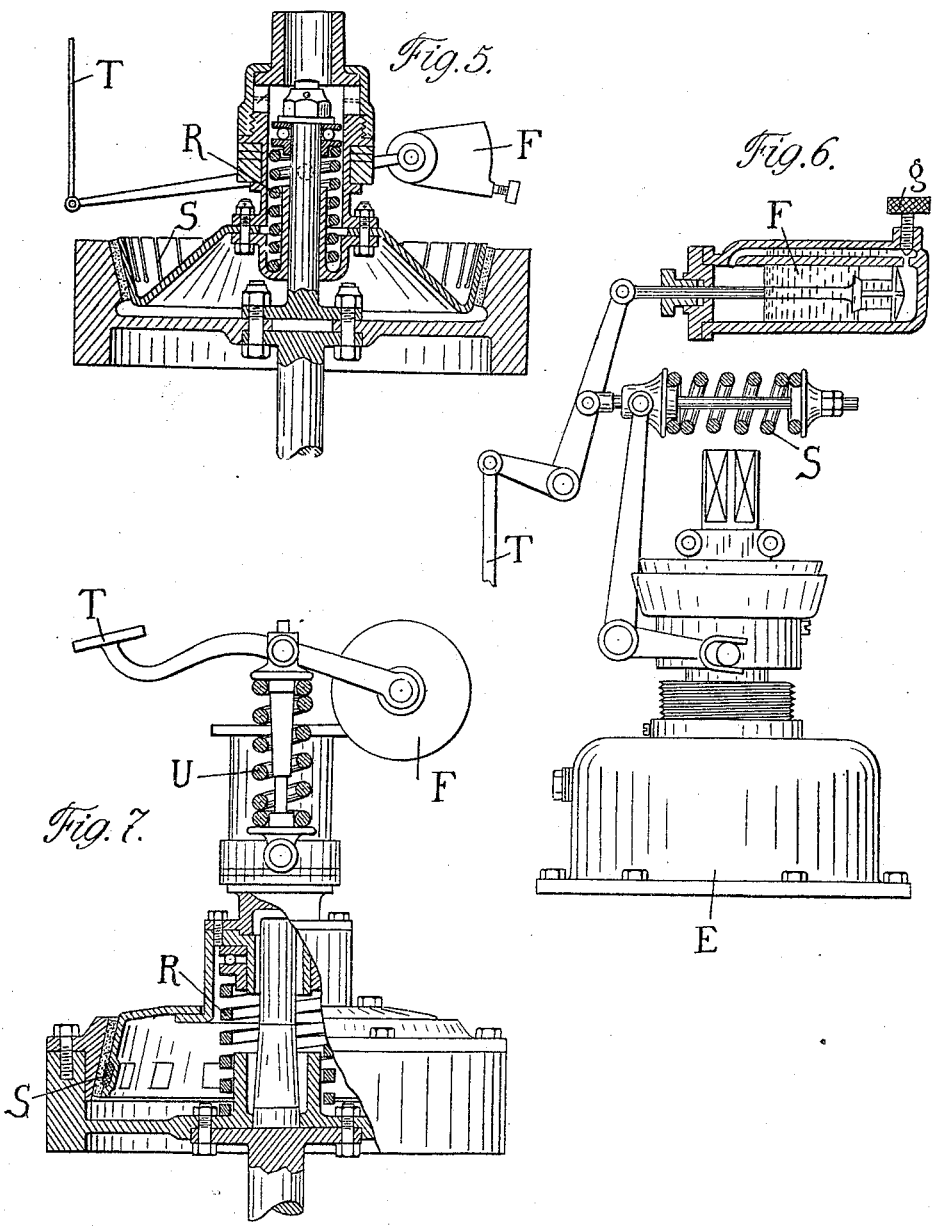

RAMÓN RUBIÓ Y ROGER, OF BARCELONA, SPAIN.

CLUTCH.

1,175,014.  Specification of Letters Patent.  Patented Mar. 14, 1916.

Application filed March 20, 1913. Serial No. 755,775.

*To all whom it may concern:*

Be it known that I, RAMÓN RUBIÓ Y ROGER, a subject of the King of Spain, residing at Corcega 228, Barcelona, Spain, have invented certain new and useful Improvements in Clutches, of which the following is a specification.

This invention relates to apparatus for obtaining an automatic and adjustable progressive action of friction clutches.

The object of the apparatus about to be described is to obtain an automatic progressive start in all clutches to which it is applied and for which the apparatus effects the automatic graduation of the pressure applied to the clutch. To this end the action of one or several auxiliary springs combined with that of a liquid check is employed. The liquid check is connected to the operating lever of the clutch and the auxiliary springs are placed directly between the liquid check and the main spring of the clutch, or between the said spring and the clutch in such a way that the auxiliary spring or springs form an elastic connection between the operating lever and the moving parts of the clutch.

The function of the liquid check is to oppose itself during the first few moments after the start, with a decreasing resistance, to the action of the main spring or springs. In order that the liquid check may act and in order also that its action may be decreasing, there is placed between it and the clutch an elastic member consisting in particular of the auxiliary spring or springs above mentioned unless the clutch by reason of its construction already possesses such springs in one form or another which impart to it the necessary elasticity. In this way it is insured that when starting and when the frictional parts are already in contact and not able to move relatively to each other, the liquid check with the operating lever will still be further moved by the action of the main spring, thus varying the tension of the auxiliary springs between very wide limits, so that the pressure on the clutch which is the result of the action of the main spring, the liquid check and the auxiliary springs, increases progressively or gradually.

The essential parts of the apparatus, namely, the liquid check, and the auxiliary springs may be applied in various ways. The liquid check is always connected to the operating lever and the auxiliary springs may be placed either between the main spring and the clutch or between the operating lever and the main spring and also in both ways combined. In any case the auxiliary springs always form an elastic member placed between the liquid check and the moving parts of the clutch. When the auxiliary springs are placed between the clutch and the main spring, they are compressed when the clutch is thrown into action and expand when the clutch is thrown out of action. In the second case they expand when the clutch is thrown into action and are compressed when it is thrown out of action. The compression in the first case and the expansion in the second case are regulated automatically by the action of the liquid check. The variation in the tension of the auxiliary springs must be sufficiently great to be capable of insuring a sufficiently progressive action. For the purpose of greater clearness and by way of example there are shown in the drawings accompanying the present specification several figures which indicate diagrammatically several forms which among others the present apparatus may assume.

Figure 1 shows my improved device in elevation; Fig. 2 shows a modification; Fig. 3 shows a constructional form of my device having two auxiliary springs; Fig. 4 illustrates a further modification; Fig. 5 shows the device as applied to a cone clutch; Fig. 6 illustrates a device according to the invention applied to a disk clutch of the Hele Shaw type; Fig. 7 shows a further modification.

All the figures are drawn to a variable scale.

In Fig. 1, E is the clutch, R is the mainspring thereof, F is the liquid check which has an orifice which can be regulated by the screw $g$, S is the auxiliary spring and T is the operating lever. When the clutch is in action the spring R transmits its thrust by the part K to the spring S which in its turn transmits the pressure by N and V and the lever L to the moving parts of the clutch E. When the lever T is pulled the part moves toward the right, thereby allowing the spring S to expand and the halves of the clutch to come apart until by striking against the stop collar M on the bar V the separation of the moving parts of the clutch is produced. During this operation the liquid check offers no resistance. In order to throw the clutch into action again it suffices to relax the pull on the lever T and the main spring R then acts on the part K which it moves toward the left thus compressing the spring S slowly owing to the resistance of the liquid check to the movement of the part K. The compression of the spring S throws the clutch into action and as this is effected gradually by the action of the liquid check F the starting is also gradual. The gradual throwing into action of the clutch will vary according as the liquid check orifices are constant or vary with the stroke, are adjustable or not, or are open or closed by valves under a constant or variable load or any other combination which can be produced from these different kinds.

In Fig. 1 the gradual action is regulated by means of the screw $g$ which is adapted to close the orifice for the outlet of the liquid to a greater or lesser extent.

Fig. 2 shows diagrammatically another arrangement of the essential parts. While the clutch is in action the main spring R transmits its thrust entirely through the parts K and L to the clutch E because the auxiliary spring is then slack. By pulling the lever T the spring S is compressed, thus neutralizing wholly or partially the action of the spring R upon the clutch until the stop M (which may be dispensed with) strikes against the part K thus producing the separation of the moving parts of the clutch. To throw the clutch into action it suffices to relax the pull on the lever T and the auxiliary spring S then expands more or less slowly according to the action of the liquid check F so that the clutch is then applied with an increasing pressure which is proportional to the difference of the pressures of R and S which reaches the maximum when the pressure of the spring S is neutralized.

In Fig. 3 is shown a view which is a combination of the preceding forms. There are two auxiliary springs U and S, the first one being placed between the main spring and the liquid check and the second between the said main spring and the moving parts of the clutch. The action is identical with that indicated in the preceding figures. When the clutch is thrown out of action U is extended and S is relaxed while the reverse takes place during the initial portion of the operation of throwing the clutch into action its duration being regulated by the liquid check F. The other parts are indicated by the same reference letters as in the preceding figures.

In Fig. 4 is shown another form of arrangement of the essential parts the action of which is similar to those in Fig. 1. The clutch E together with that portion of the shaft corresponding thereto can be moved endwise by compressing the auxiliary spring S by means of the action of the main spring R regulated by the liquid check F. The clutch is thrown into action by the compression of the spring S. P is the bracket or standard which carries the clutch and the other parts are indicated by the same reference letters as heretofore.

Fig. 5 illustrates an application of the apparatus shown to a cone clutch in which the male cone is covered with leather. The main spring is a steel spiral which is contained in the sleeve which surrounds the shaft; the liquid check, lettered F, is in the form of a circular sector with a wing-shaped piston connected to the revolving shaft which in its turn is connected to the operating lever. The periphery of the male cone is elastic, owing to a number of saw cuts in it and constitutes the auxiliary spring. The said cuts are indicated by the letter S. The clutch is thrown into action by the compression of the spring S which is gradual owing to the action of the liquid check F.

In Fig. 6 is shown an application of the invention to a disk clutch of the "Hele Shaw" type. The main spring is contained in the interior of the clutch and is not visible in the figure. S indicates the auxiliary spring and F the liquid check with the regulating screw $g$. By pulling the lever T the clutch is thrown out of action by the spring S which counteracts that of the main spring. When the lever T is released the spring S is released slowly by the action of the liquid check and gradually throws the clutch into action.

Fig. 7 illustrates another method of application. The clutch is composed of leather cones and there are two auxiliary springs U and S, a main spring R and the liquid check F connected to the operating pedal T. The auxiliary spring or more properly the set of auxiliary springs S is constituted by a number of india rubber disks placed underneath the leather with which the male cone is covered. Throwing the clutch into action produces the flattening of the disks S and the slackening of the spring U which acts by opposition which diminishes as the liquid check F yields.

The construction of Fig. 5 is equivalent to that of Fig. 1. that of Fig. 6 to that of Fig. 2 and that of Fig. 7 to that of Fig. 3.

Having described my invention, what I claim, and desire to secure by Letters Patent, is:—

1. A friction clutch comprising a main spring by means of which the clutch is operated, an auxiliary spring for modifying the action of the main spring and a liquid check for regulating the action of the said main spring, in order to obtain an automatically progressive clutch action.

2. A friction clutch comprising a main spring, an auxiliary spring for modifying the action of the said main spring, an operating lever connected to the clutch and to the said main spring, a bar for said spring, a sleeve adapted to slide on said bar, and connected to said operating lever, and a liquid check connected to said lever.

3. A friction clutch, comprising a main spring by means of which the clutch is operated, an operating lever for said clutch, a liquid check connected to said operating lever and an auxiliary spring between the liquid check and the clutch.

4. A friction clutch, comprising a main spring, by means of which said clutch is operated, a bar for said main spring, a sleeve sliding on said bar, an operating lever connected to said sleeve, a liquid check connected to said operating lever, an auxiliary spring between said sleeve and the liquid check and a second auxiliary spring between the sleeve and the clutch.

In testimony whereof I affix my signature.

RAMÓN RUBIÓ Y ROGER.